United States Patent [19]

Bertone et al.

[11] Patent Number: 4,807,946
[45] Date of Patent: Feb. 28, 1989

[54] ANTI-SKID BRAKE CONTROL SYSTEM

[75] Inventors: Antonino Bertone, S. Antonino di Saluggia; Luigi P. Ippolito, Turin, both of Italy

[73] Assignee: Fiat Auto S.p.A., Turin, Italy

[21] Appl. No.: 99,449

[22] Filed: Sep. 21, 1987

[30] Foreign Application Priority Data

Sep. 26, 1986 [IT] Italy ................. 67736 A/86

[51] Int. Cl.$^4$ ............................. B60T 8/42
[52] U.S. Cl. .................. 303/115; 303/6.01; 303/71; 303/119
[58] Field of Search ............ 303/115, 114, 119, 6 R, 303/10, 61, 71, 116, 117, 118, 62, 63, 6.01, 9.61, 9.73, 9.74; 188/181 A

[56] References Cited

U.S. PATENT DOCUMENTS

| | | | |
|---|---|---|---|
| 3,760,912 | 9/1973 | Braun | 303/6 R |
| 3,941,427 | 3/1976 | Harries | 303/115 |
| 4,027,924 | 6/1977 | Kondo | 303/115 |
| 4,066,301 | 1/1978 | Harries | 303/115 |
| 4,095,851 | 6/1978 | Ando et al. | 303/115 |
| 4,162,108 | 7/1979 | Shimizu | 303/115 |
| 4,600,245 | 7/1986 | Watanabe | 303/115 |

FOREIGN PATENT DOCUMENTS

| | | |
|---|---|---|
| 2617726 | 11/1976 | Fed. Rep. of Germany . |
| 2737938 | 3/1978 | Fed. Rep. of Germany . |
| 2942517 | 4/1981 | Fed. Rep. of Germany . |
| 2009348 | 6/1979 | United Kingdom . |

Primary Examiner—Andres Kashnikow
Assistant Examiner—Mark T. Le
Attorney, Agent, or Firm—Sughrue, Mion, Zinn, Macpeak & Seas

[57] ABSTRACT

An anti-skid brake control system includes a fluid distributor member with first and second chambers, each of which is associated with a respective one-way valve for connecting it to the source and for preventing the propagation of fluid pressure from the source and for preventing the propagation of fluid pressure from the source to the respective chamber. A piston is sealingly slidable in each chamber and divides the chamber into a first volume, which communicates with the one-way valve associated with the respective chamber, and a second volume. The first volume of the first chamber communicates with the second volume of the second chamber. Each piston has an actuator for keeping the adjacent one-way valve in an open position when the piston is moved toward the one-way valve. An actuator selectively applies a force to the piston in the first chamber to move the piston. A valve member is provied for each group of brake members with a first intake duct connectible to the source of fluid operating pressure, a second intake duct communicating with the first volume of the first and second chambers, respectively, and at least one further duct communicating with the brake members of the group. The valve member including a first obturator interposed in the first intake duct and normally open, and a second obturator interposed in the second intake duct and normally closed. A brake control circuit, with a sensor which can detect the tendency of the wheels to lock causes the deactivation of the actuator means, with the stoppage of the force, the closure of the first obturator means of the respective valve member, and the opening of the second obturator means of the respective valve member.

4 Claims, 5 Drawing Sheets

ANTI-SKID BRAKE CONTROL SYSTEM

BACKGROUND OF THE INVENTION

The present invention relates to devices for the selective application of fluid operating pressure to groups of brake members associated with the wheels of a vehicle.

More precisely, the invention concerns a device which enables the locking of one or more wheels of the vehicle, with the resulting loss of grip thereof, to be avoided during braking of the vehicle.

Various devices or systems of this type are known in the art.

A first solution currently adopted, particularly in very expensive motor cars, provides for the use of an electric pump as the source of fluid braking pressure. This pressure is then applied to various brake members of the vehicle through respective solenoid valves. This solution allows very good functional results to be obtained but has the disadvantage of being very expensive.

Even higher manufacturing and assembly costs are involved in systems in which the anti-locking function for the wheels is combined with a servobrake system.

Hydromechanical or pneumo-hydraulic anti-locking systems have also been developed which are much cheaper than the solutions described above. The advantages resulting from this cheapness, however, are tempered by difficulties of installation in vehicles, by the dimensions of the system, and (particularly in the case of pneumo-hydraulic systems) by a certain slowness of operation and limitation of the overall brake capacity.

SUMMARY OF THE INVENTION

The object of the present invention is to provide a device of the type specified above which combines characteristics of simplicity and cheapness of manufacture and characteristics of complete reliability and efficiency in use and ease of installation, particularly with regard to the possibility of adaptation of the device to various operating configurations (structure of the brake device, use of pneumatic or hydraulic pressure) depending on specific applicational requirements.

According to the present invention, this object is achieved by a device for the selective application of a fluid operating pressure generated by a source to groups of brake members associated with the wheels of a motor vehicle, characterised in that it comprises:

a fluid distributor member with first and second chambers, each of which is associated with a respective one-way valve for connecting it to the source and for preventing the propagation of fluid pressure from the source to the respective chamber, a piston being sealingly slidable in each chamber and dividing the chamber into a first volume which communicates with the one-way valve associated with the respective chamber and a second volume, the first volume of the first chamber communicating with the second volume of the second chamber; each piston carrying associated actuator means which can keep the one-way valve associated with the respective chamber in an open position when the piston is in an advanced position towards the first volume of the respective chamber, actuator means selectively actuable to apply force to the piston in the first chamber such as to move the piston into an advanced position towards the first volume of the first chamber, for each of the first and second chambers and for each group of brake members, a respective valve member with a first intake duct connectible to the source of fluid operating pressure, a second intake duct communicating with the first volume of the respective between the first and second chambers, and at least one further duct communicating with the brake members of the group; the valve member including first obturator means interposed in the first intake duct and normally open, and second obturator means interposed in the second intake duct and normally closed, and a brake control circuit with sensor means which can detect the tendency of the wheels associated with the brake members of the group to lock and which can, upon a manifestation of this tendency to lock, effect a selectively predetermined sequence:

the deactivation of the actuator means, with the stoppage of the force, the closure of the first obturator means of the respective valve member, and the opening of the second obturator means of the respective valve member.

BRIEF DESCRIPTION OF THE DRAWINGS

The invention will now be described, purely by way of non-limiting example, with reference to the appended drawings, in which.

DESCRIPTION OF THE PREFERRED EMBODIMENTS

In all the figures of the drawings, the brake units associated with the four wheels (not specifically illustrated) of a motor vehicle, such as a motor car, are indicated $B_1$, $B_2$, $B_3$ and $B_4$.

More precisely, the brakes associated with the left- and right-hand front wheels are indicated $B_1$, $B_2$ respectively, while the brakes associated with the rear wheels, are indicated $B_3$ and $B_4$, again the left- and right-hand wheels respectively.

During braking and according to criteria which will be explained better below, the fluid pressure generated by a source S constituted, in the embodiment illustrated, by the master cylinder of an ordinary brake system actuable selectively by the driver of the motor vehicle pressing on a pedal P is applied to the brakes $B_1$–$B_4$.

In the following description, constant reference will be made to a device in which the fluid operating pressure for the brakes is a hydraulic pressure. The solution of the invention, however, can be applied equally to pneumatic braking systems.

The motor vehicle (not illustrated in its entirety) in which the device 1 of the invention is mounted is driven by an internal combustion engine of which only the induction manifold C is illustrated, within which there is a sub-atmospheric pressure (vacuum) during normal running of the vehicle.

Movement sensors (of which there are two in the embodiment of FIG. 1 and four in the embodiment of FIGS. 2 to 4) are indicated $R_1$, $R_2$, $R_3$ and $R_4$, each of which can generate at its output a signal indicative of the speed of rotation of the wheel with which the sensor is associated.

The sensors $R_1-R_4$ may be constituted, for example, by phonic-wheel sensors.

The function of the sensors $R_1$, $R_4$ is to enable a control circuit 10, the operation of which will be described more fully below, to detect when—during braking—one or more of the wheels of the vehicle is close to locking and consequently losing its grip on the ground.

Two output lines are indicated 12 and 14, through which the fluid braking pressure generated by the source S is conveyed to the brake members $B_1-B_4$.

These are generally divided into groups of members to which the operating pressure must be transferred substantially uniformly.

Figure 1:
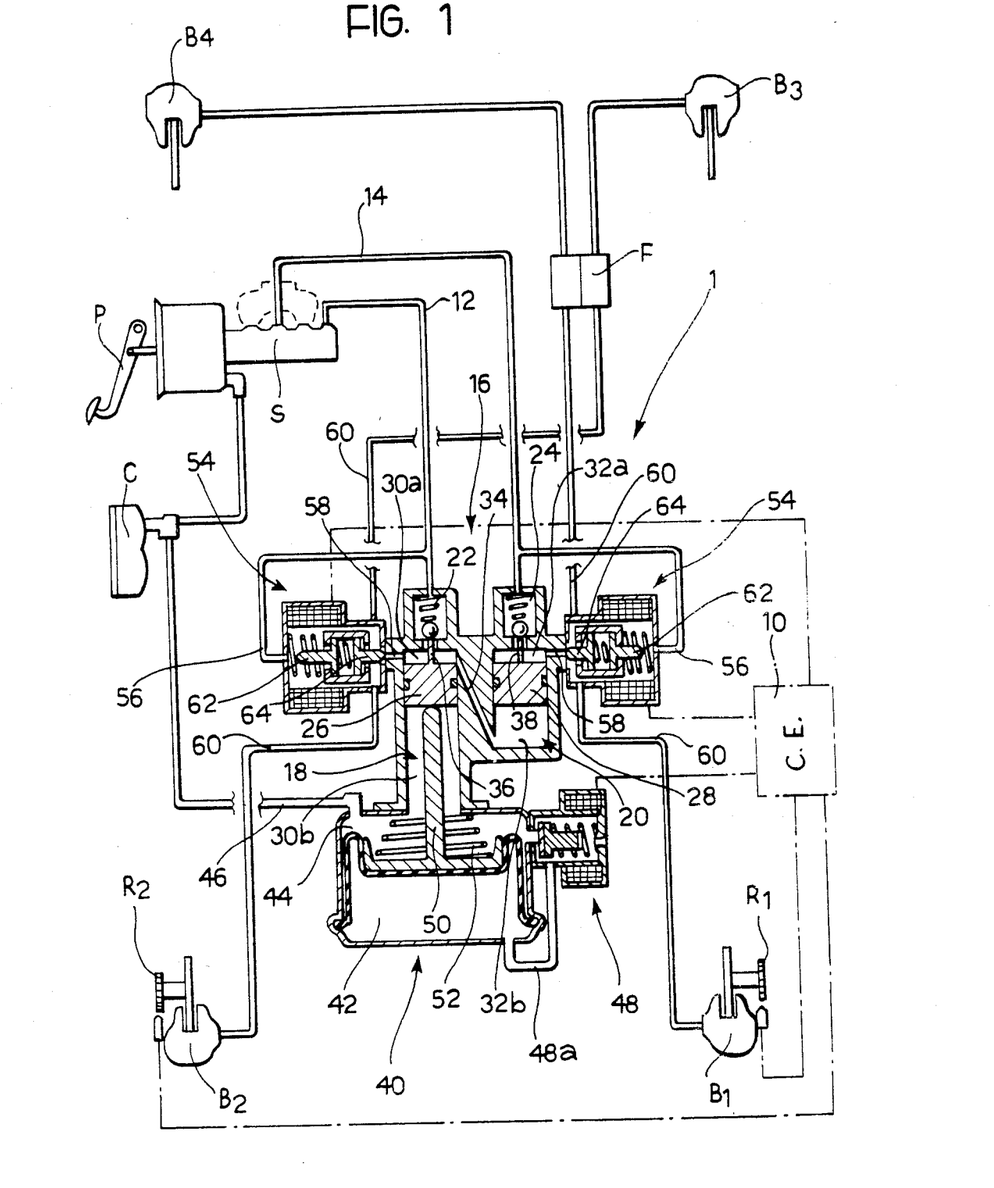
FIG. 1 illustrates a first embodiment of a device according to the invention.

In the embodiment of FIG. 1, (a brake system with a diagonal configuration) the members $B_1$ and $B_4$ form a first group, while a second group is formed by the brake members $B_2$ and $B_3$.

Figure 2:
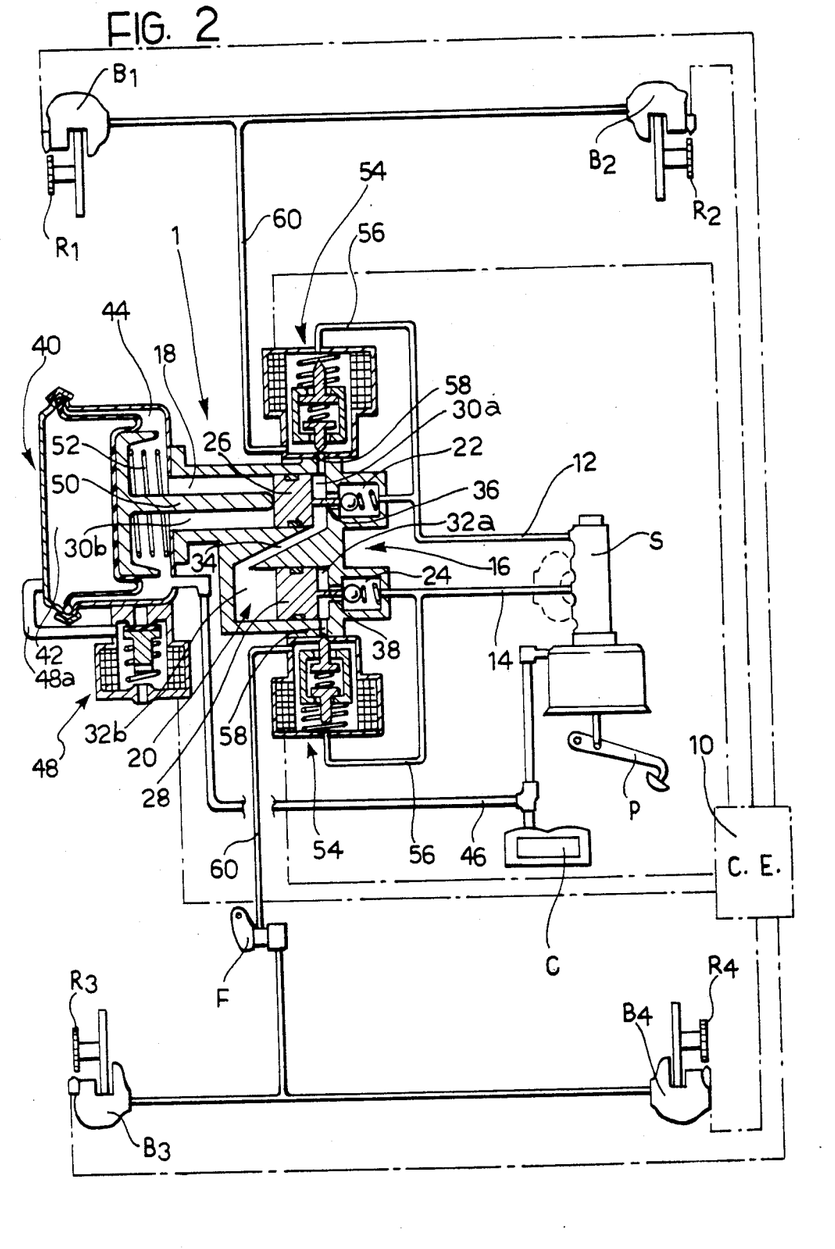
FIG. 2 illustrates the device of FIG. 1 according to a first possible variant of use.

In the embodiment of FIG. 2, the members $B_1$ and $B_2$ form the first group, while the second group is formed by the members $B_3$ and $B_4$.

Figure 3:
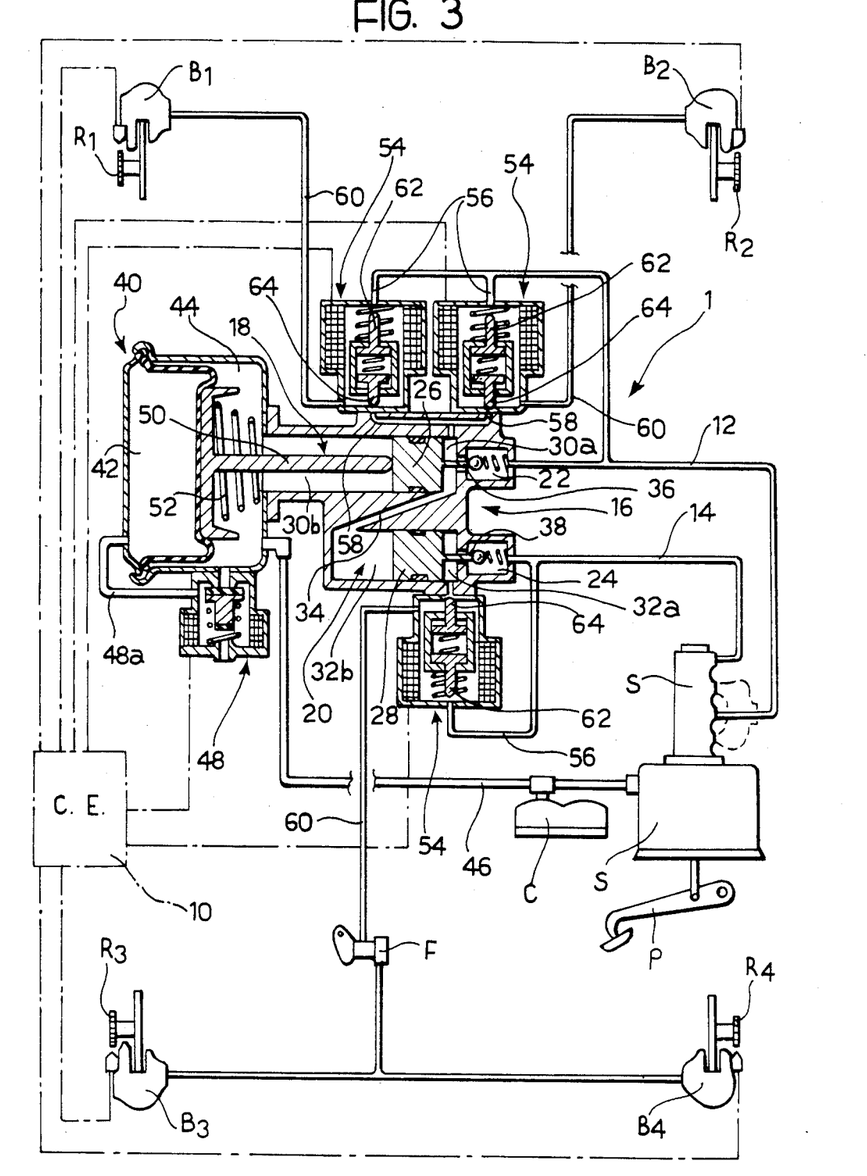
FIGS. 3 and 4 illustrate two possible variants of the device of FIGS. 1 and 2.

In the embodiment of FIG. 3, the members $B_1$ and $B_2$ each form a group constituted by a single element, while the members $B_3$ and $B_4$ form a third group.

Figure 4:
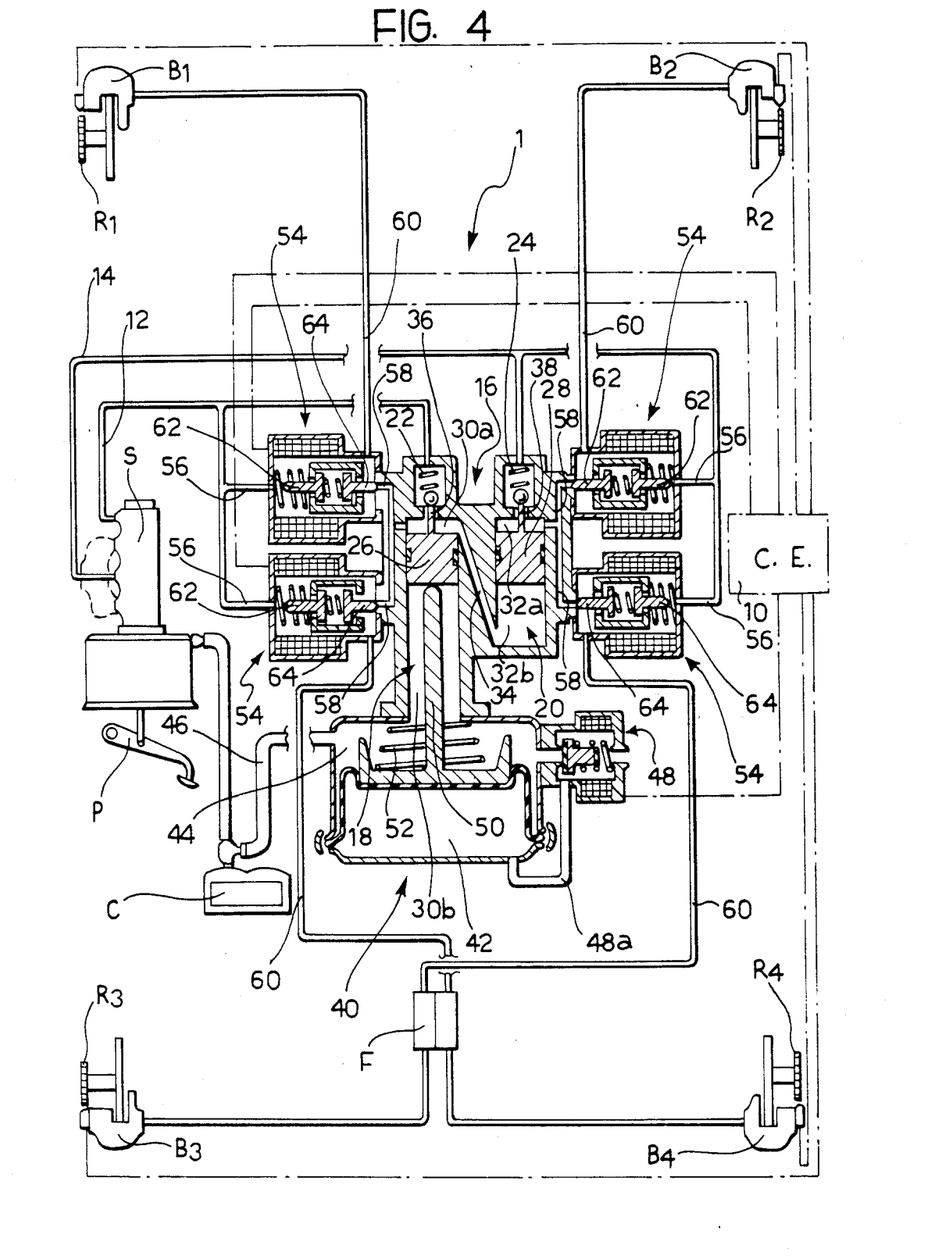

Finally, in the embodiment of FIG. 4, each of the brake members $B_1$, $B_2$, $B_3$ and $B_4$ forms a respective group independent from the others.

A hydraulic distributor, generally indicated 16, comprises first and second chambers, indicated 18 and 20 respectively, connected to the line 12 and to the line 14 respectively through one-way ball valves 22 and 24.

The valves 22 and 24 have respective ball obturators which can block the propagation of fluid operating pressure in the lines 12 and 14 towards the chambers 18 and 20.

Two pistons are indicated 26 and 28, each of which is sealingly slidable within one of the chambers 18 and 20.

Each piston subdivides the respective chamber into a first volume 30a, 32a communicating with a respective one-way valve 22 and 24, and a second volume 30b, 32b.

A duct 34 extends generally obliquely within the body of the distributor 16 and puts the first volume 30a of the first chamber 18 into communication with the second volume 32b of the second chamber 20.

Each of the pistons 26, 28 is also provided with a rod appendage which, starting from the face of the piston 26, 28 facing the first volume 30a, 32a of the respective chamber 18, 20, extends towards the obturator of the corresponding one-way valve 22, 24.

The function of these rod appendages, indicated 36 and 38, is to move the respective one-way valve 22, 24 into an open position and to keep it there when the piston 26, 28 is in the advanced position within the first volume 30a, 32a of the respective chamber 18, 20.

A barometric-capsule actuator, generally indicated 40, includes first and second chambers 42, 44, the latter of which is connected to the induction manifold C through a duct 46.

A further solenoid valve 48 communicates with the first chamber 42 of the actuator 40 through a duct 48a and puts this chamber into communication with the external enviroment and the second chamber 44 alternatively.

A pusher member, indicated 50, projects from the diaphragm of the barometric actuator 40 towards the piston 26 mounted in the first chamber 18.

The arrangement of assembly of the solenoid valve 48 is such that, when the solenoid valve 48 itself is in the de-energised closed position, the first chamber 42 of the actuator 40 communicates with the external environment, while the sub-atmospheric pressure (vacuum) in the manifold C is transferred into the second chamber 44. As a result of the pressure difference between the two chambers 42 and 44, the diaphragm of the actuator 40 deforms against the biasing force exerted by a spring 52 interposed between the diaphragm itself and the body of the distributor 16, causing the pusher member 50 to advance into the chamber 18. The piston 26, under the action of the pusher 50, also advances towards the first volume 30a of the chamber 18 to cause, through its appendage 36, the obturator of the one-way valve 22 to move away from the closed position.

On the other hand, when the solenoid valve 48 is moved into its energised or open position, the chambers 42 and 44 are placed in communication with each other through the duct 48a.

The diaphragm of the actuator 40 is no longer subject to a pressure gradient whereby it returns to the equilibrium position set by the biasing spring 52, moving the pusher member 50 away from the piston 26. The piston 26 is thus free to move away from the one-way valve 22 and allow the latter to return to its closed position.

Further solenoid valves, which are structurally identical to one another and whose number and/or arrangement differs according to the various embodiments of FIGS. 1 to 4, are indicated 54.

In general, each solenoid valve 54 is connected to a respective chamber 18, 20 of the actuator 16 and to a respective group of brake members $B_1-B_4$.

More particularly, the embodiments of FIGS. 1 and 2 have two solenoid valves 54, one connected to the first chamber 18 and the second connected to the second chamber 20. In the embodiment in FIG. 1, the first solenoid valve 54 is connected to the group of brake members constituted by the brakes $B_2$ and $B_3$, while the other solenoid valve 54 is connected to the second group of brake members constituted by the brakes $B_1$ and $B_4$. In the embodiment of FIG. 2, the solenoid valve 54 connected to the first chamber 18 is connected instead to the group of brake members constituted by the brakes $B_1$ and $B_2$, while the other solenoid valve 54 is connected to the group of brake members constituted by the brakes $B_3$ and $B_4$.

In the embodiment of FIG. 3, the arrangement of the solenoid valve 54 associated with the second chamber 20 is indentical to that of the equivalent solenoid valve of FIG. 2. On the other hand the first chamber 18 is connected to two solenoid valves 54, one connected to the brake $B_1$ and the other to the brake $B_2$.

In the embodiment of FIG. 4, however, there are four solenoid valves 54, two for each of the chambers 18 and 20, each of which is connected to one of the brakes $B_1$, $B_2$, $B_3$ and $B_4$.

Apart from the specific configuration of connection, each solenoid valve 54 can be seen to include:

a first intake duct 56 connected to the fluid pressure source S through one of the lines 12, 14, a second intake duct 58 communicating with the first volume 30a or 32a of the respective chamber 18 or 20, and at least one further duct 60 through which the solenoid valve 54 communicates with the brake members $B_1-B_4$ of the respective group.

In the embodiment of FIG. 1, two ducts 60 branch from each solenoid valve 54 and terminate at the brake members $B_1$, $B_4$ and $B_2$, $B_3$ disposed along one of the diagonals of the vehicle. In the embodiments of FIGS. 2 to 4, however, only one duct 60 branches from each solenoid valve 54 and terminates at the brake members of the respective group.

In all four Figures, a brake corrector device of known type, indicated F, is interposed, according to known criteria, in some of the ducts 60 which carry the fluid operating pressure to the brake members $B_1$–$B_4$.

It should also be noted that, in each solenoid valve 54, the first and second intake ducts 56, 58 are connected (the first directly, the second through the one-way valve 22 or 24) to the same line 12 or 14 from the master cylinder S.

Each solenoid valve 54 is also provided with first and second obturators, indicated 62 and 64, which can be operated independently so as to control the opening and closure of the first and second ducts 56, 58 of the solenoid valve 54 itself.

In general, the first obturator 62 is of the normally-open type, while the second obturator 64 is of the normally-closed type.

Solenoid valves 54 having the characteristics described are readily available commercially. By way of example, reference may be made to REXROTH three-way and three-position hydraulic solenoid valves.

The operation of the solenoid valve 48 which controls the barometric actuator 40 and of the solenoid valves 54 is controlled by the unit or central control 10 in dependence on the wheels movement signals generated by the sensors (phonic wheels) $R_1$–$R_4$ according to criteria which will be described briefly below.

In order not to burden the text, reference will be made mainly to the operating criteria of the device illustrated in FIG. 1.

In normal running conditions (absence of braking), the solenoid valve 48 and all the solenoid valves 54 are kept de-energised.

The second chamber 44 of the actuator 40 is connected to the induction manifold C whereby the diaphragm of the actuator 40 itself is deformed by the pressure difference between the chambers 42 and 44. The pusher member 50 acts on the piston 26 whose rod 36 keeps the one-way valve 22 open.

As a result of the force exerted by the member 50 on the piston 26, the first volume 30a of the first chamber 18 is at a certain fluid pressure which is also transferred to the second volume 32b of the second chamber 20 through the duct 34. The piston 28 in this chamber is thus also thrust towards the respective one-way valve 24 the obturator of which is kept in the open position by the rod 38. In this respect, it is noted that the second obturators 64 of the solenoid valves 54 are normally closed and thus prevent the passage of pressurised fluid through the second intake ducts 58.

In order to brake the vehicle, the driver presses the pedal P whereby the fluid pressure generated in the master cylinder S is propagated to the distributor 16 through the lines 12 and 14. The fluid pressure may propagate through the first ducts 56, which are kept open, towards the ducts 60 and through the latter to the brake members.

The one-way valves 22, 24 remain open until the pressure therein, which is applied to the pistons 26 and 28, reaches a predetermined maximum value provided for the intervention of the anti-locking action for the wheels.

When one of the sensors $R_1$ or $R_2$ (or $R_3$ or $R_4$ in the embodiment of FIGS. 2 and 4) transmits a tachometric signal to the unit 10 indicative of a tendency of the respective wheel to lock, the unit 10 itself effects the energization of the solenoid valve 48. The two chambers 42, 44 of the actuator 40 are thus put into contact through the duct 48a and the pusher member 50 moves away from the piston 26. In its turn, the latter moves away from the valve 22 which closes as a result of the pressure difference to which it is subjected.

As a result of the connection between the first volume 30a of the first chamber 18 and second volume 32b of the second chamber 20 established by the duct 34, the movement of the piston 26 away from the one-way valve 22 causes a corresponding movement of the piston 28 away from the one-way valve 24 which also closes.

If, upon analysis of the signal emitted by the respective sensor, the unit 10 detects the persistance of the tendency of a wheel to lock, the unit 10 reduces the intensity of the braking action exerted on the wheel.

For this purpose, the unit 10 first commands the closure of the first obturator 62 of the respective solenoid valve 54 connected to the duct 60 which transfers the braking pressure to the wheel that is tending to lock. Thus, the wheel in question or, more precisely, the brake member associated therewith is, so to speak, separated from the master cylinder S (holding position).

Subsequently, the unit 10 effects the opening of the second obturator 64 of the same solenoid valve 54 so as to cause the opening of the second intake duct 58 of the solenoid valve. In these conditions, the fluid braking pressure accumulated within the duct 60 flows into the first volume 30a or 32a of the chamber 18, 20 to which the respective solenoid valve 54 is connected.

The thrusting action exerted by the member 50 being absent, the piston 26 or 28 mounted in the chamber 18, 20 into which the fluid braking pressure is discharged moves without load, that is, without offering substantial resistance, whereby the wheel which had tended to lock is immediately released from the braking action.

It may be noted that, once the solenoid valve 48 has been de-energised and the piston 26 disengaged from the pusher member 50, the operation of the obturators 62 and 64 of each solenoid valve 54 may be controlled by the unit 10 entirely independently of the operation of the obturators 62, 64 of the other solenoid valves 54.

Thus, it is possible to exert an independent anti-locking action on each of the groups in which the brake members of the vehicle are arranged.

For example, with reference to the device of FIG. 1, the braking pressure applied to the members $B_1$ and $B_4$ disposed along one diagonal may be reduced (obturator 64 open), while the braking pressure applied to the members $R_2$ and $B_3$ of the other diagonal may be maintained (obturators 62 and 64 both closed).

Alternatively, the braking pressure may be reduced on both diagonals but in time intervals which are at least partly distinct (different instants of opening of the obturators 64 of the two solenoid valves 54). The same applies to the device of FIG. 2, in which it is possible to achieve the anti-locking action on the wheels of the two axles according to different criteria, the brake members $B_1$, $B_2$ and $B_3$, $B_4$ of each axle being controlled by a respective solenoid valve 54.

The devices of FIGS. 3 and 4 allow even greater flexibility of operation.

In the case of the device of FIG. 3, the anti-locking action may be actuated by different criteria on the two axles, with the further possiblity of differentiating the logics of intervention on the two wheels of the front axle.

The brake members $B_1$, $B_2$ associated with front wheels of the vehicle are in fact controlled separately by respective solenoid valves 54.

In the case of the device of FIG. 4, in which a respective solenoid control valve 54 is provided for the brake members $B_1$–$B_4$ of each wheel, it is possible to achieve an entirely independent anti-locking action for each wheel of the vehicle.

Immediately the tachometric signal generated by the sensor associated with the wheel which is at risk of becoming locked indicates that the wheel has started to rotate at a velocity such as to ensure good road holding, the unit 10 re-establishes the conditions which enable this wheel to be braked again.

For this purpose, the unit 10 again controls the de-energisation of the solenoid valve 48, putting the chamber 42 of the actuator 40 back into contact with the external environment. As a result of the deformation induced by the presence, within the chamber 44, of a sub-atmospheric pressure from the induction manifold C, the diaphragm of the actuator 40 puts the member 50 back into contact with the piston 26. The latter is again thrust towards the one-way valve 22, causing the compression of the brake fluid which is in the first volume 30a of the respective chamber 18. A similar thrust towards the one-way valve 24 is imposed on the piston 28 as a result of the fluid connection established by the duct 34. Again in this case, there is a reduction in the first volume 32a into which the second intake duct 58 of the solenoid valve 54 opens.

Through the second ducts (or at least through those of them which are open, or remain open, to bring the respective obturator 64 into its open position when the anti-locking action occurs) the brake fluid in the chambers 18 and/or 20 during the anti-locking action may again flow through the ducts 60 towards the brake members.

In other words, the thrust developed by the member 50 as soon as the solenoid valve 48 is returned to the de-energised position is translated immediately into a fluid braking pressure which is transmitted towards the brake members previously subject to the anti-locking action.

At the and of the advance towards the one-way valves 22 and 24, the pistons 26 and 28 return the valves 22 and 24 to the open position by means of their appendages 36 and 38.

The fluid braking pressure generated by the source S can then be transferred directly to the brake members through these valves which have returned to their open positions, by means of the second ducts 58 already open, thus completely and rapidly re-establishing the braking action.

When the tendency to lock is manifested on the same or another wheel of the vehicle, the unit 10 reactivates the anti-locking function in accordance with the criteria described above, operating the solenoid valve 54 which controls the brake members associated with the wheel that is tending to lock.

It is thus possible to start an alternating sequence of operations of release of the brakes (brake release) and re-application of the brakes (re-braking) which enables the loss of grip of the wheels on the ground to be avoided.

Naturally, the unit 10 is in general sensitive to the interruption of the braking action, that is, to the release of the brake pedal P by the driver (for this purpose, it may be provided with a sensor having a dedicated connection, not illustrated). In this case, the unit 10 provides for the return to the normal running conditions of the vehicle (solenoid valve 48 de-energised and solenoid valve 54 also de-energised).

Finally, it should be noted that the presence of the two one-way valves 22 and 24 means that the fluid braking pressure generated at any moment by the driver acting on the master cylinder S is compared continuously, during activation of the anti-locking function, with the fluid pressure present in the first volume 30a, 32a of each of the chambers 18 and 20, causing an immediate reduction in the latter when the pressure of the source S is reduced as a result of a reduction in the intensity of the braking action of the driver.

This prevents the operating pressure applied to the brake members during re-application of the brakes (re-braking) from accidently surpassing that imposed by the driver by means of the pedal P.

Figure 5:
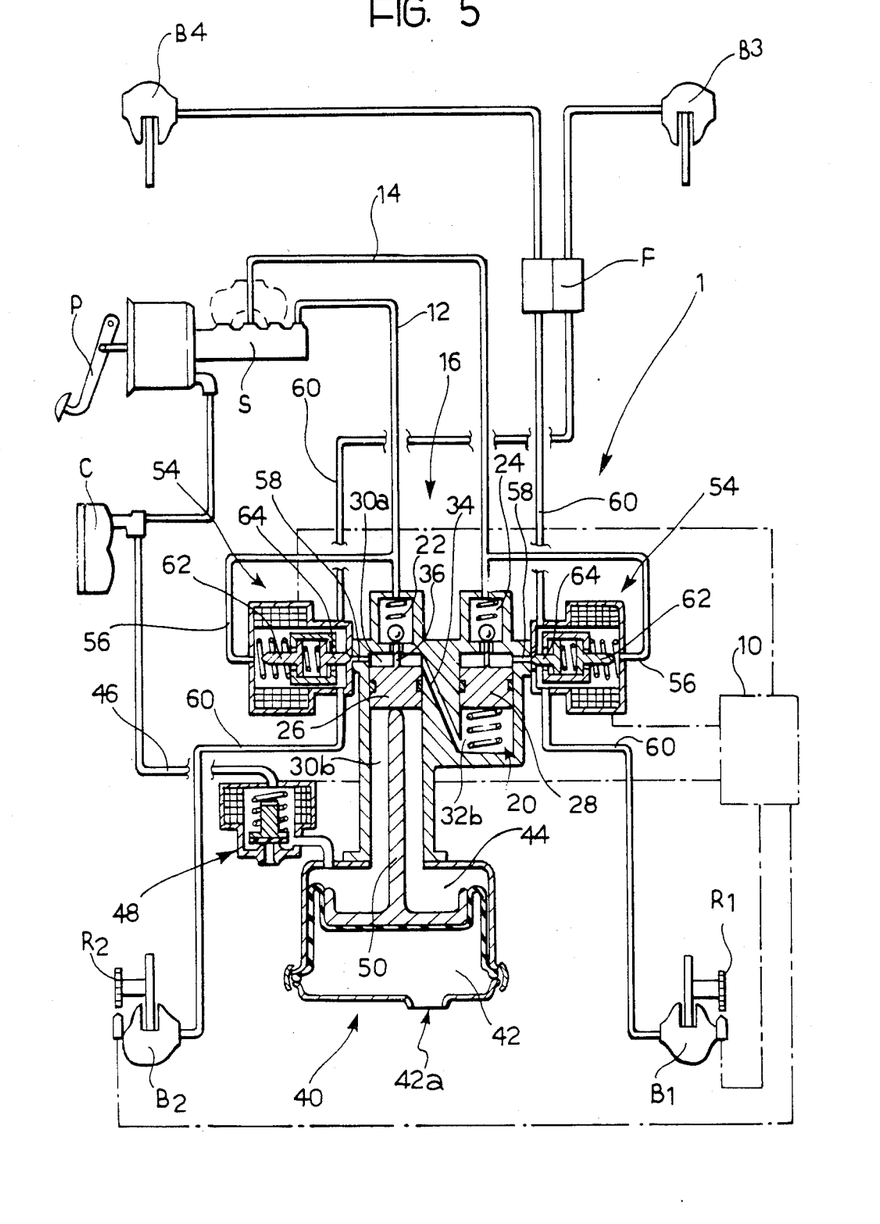
FIG. 5 illustrates a further possible variant of the invention, with reference to the layout of FIG. 1.

FIG. 5 illustrates, with reference to the diagragm of FIG. 1, a further embodiment in which the solenoid valve 48 is interposed between the induction manifold C and the second chamber 44 of the actuator 40, while the first chamber 42 is in communication with the external environment through an aperture 42a. Thus, the chamber 42 is always in communication with the atmosphere.

According to the invention, the possiblity is also provided of using several solenoid valves 48 (this is also true for the other embodiments of FIGS. 2 to 4).

The solution of FIG. 5 simplifies the connection (in practice, the duct 48a is eliminated) while maintaining the functional characteristics of the system. According to this embodiment, the biasing spring 52 is also eliminated.

We claim:

1. A device for the selective application of a fluid operating pressure generated by a source to groups of brake members associated with wheels of a vehicle, including:

a fluid distributor member with first and second chambers, each of which is associated with a respective one-way valve for connecting it to the source and for preventing the propagation of fluid pressure from the source to the respective chamber, a piston being sealingly slidable in each chamber and dividing the chamber into a first volume, which communicates with the one-way valve associated with the respective chamber, and a second volume, the first volume of the first chamber communicating with the second volume of the second chamber; each piston carrying associated actuator means which can keep the one-way valve associated with respective chamber in an open position when the piston is in an advanced position towards the first volume of the respective chamber electrically operated actuator means selectively actuable to apply a force to the piston in the first chamber such as to move the piston into an advanced position towards the first volume of the first chamber solenoid valve means for each group of brake members, each solenoid valve means having a first intake duct connected to the source of fluid operating pressure, a second intake duct communicating with the first volume of said first and second chambers, respectively, and at least one further duct communicating with the brake members of the group; the solenoid valve means including first obturator means interposed in the first intake duct which is always opened during a normal braking operation for allowing fluid communication between the source and the brake members, and a second obturator means interposed in the second intake duct which is always closed during a normal braking operation, sensor means associated with at least two wheels which can detect the tendency of the wheels associated with the brake members of the group to lock and which can, upon a manifestation of this tendency to lock provide an electrical signal, and brake control circuit means connected to said sensor means, said electrically operated actuator means, and said solenoid valve means whereby upon receipt of said signal from a sensor means said brake control circuit means causes the deactivation of the electrically operated actuator means, with the stoppage of the force, the closure of the first obturator means of the respective solenoid valve means, and the opening of the second obturator means of the respective solenoid valve means.

2. A device according to claim I, wherein the source of fluid operating pressure includes two output lines, each of which is connected to one of the first and second chambers, the first intake duct of each respective solenoid valve means being connected to that of the two output lines which is connected to the respective one of the first and second chambers.

3. A device according to claim 1, for use in motor vehicles driven by any internal combustion engine with an induction manifold, wherein the electrically operated actuator means comprise:

a barometric actuator with two operating volumes one of which is connected to the induction manifold, a further valve member which can be controlled by the brake control circuit means to cause the selective establishment of a pressure different between the two operating volumes, and transmission means interposed between the barometric actuator and the piston mounted in the first chamber to convert the pressure difference into a force applied on the piston.

4. A device according to claim 1, wherein the brake control circuit means, upon receiving a signal from said sensor means indicating a manifestation of the locking tendency, causes in sequence:

the deactivation of the electrically operated actuator means, the closure of the first obturator means of the respective solenoid valve means, the opening of the second obturator means of the respective solenoid valve means, and the reactivation of the electrically operated actuator means.

* * * * *